Figure 1:
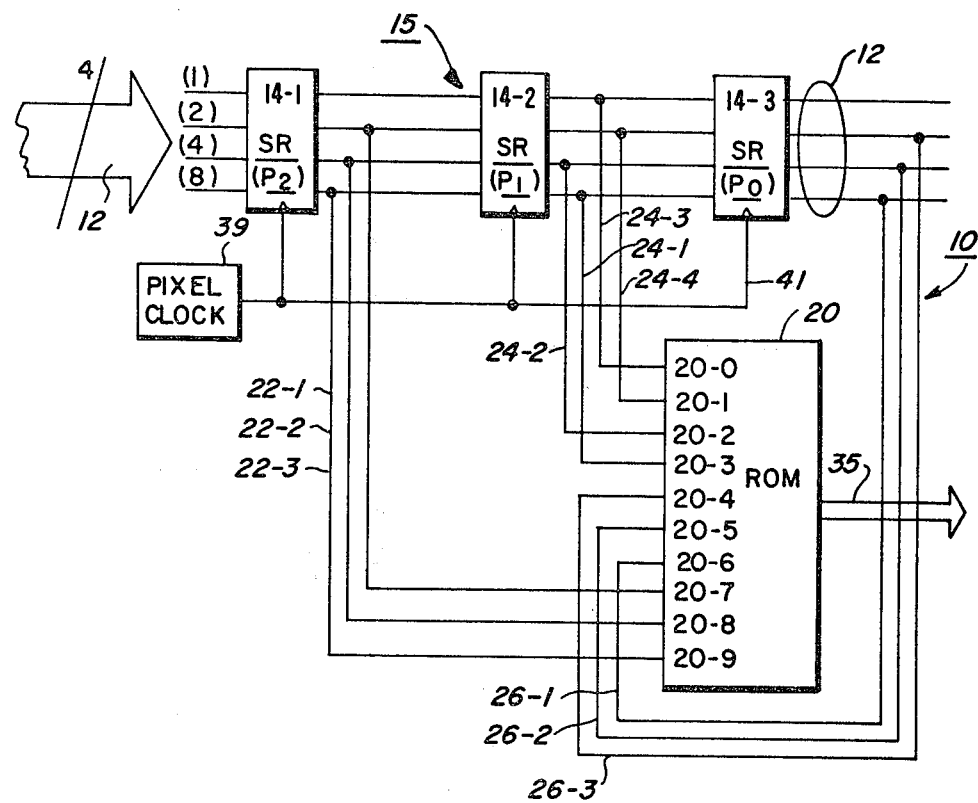

United States Patent [19]

Tuhro et al.

[11] 4,430,748
[45] Feb. 7, 1984

[54] IMAGE THRESHOLDING SYSTEM

[75] Inventors: Richard H. Tuhro, Webster; Douglas G. Wiggins, Penfield, both of N.Y.

[73] Assignee: Xerox Corporation, Stamford, Conn.

[21] Appl. No.: 304,429

[22] Filed: Sep. 21, 1981

[51] Int. Cl.³ ............................................. G09G 1/00
[52] U.S. Cl. ................................... 382/50; 340/728; 340/747; 340/793; 340/801
[58] Field of Search ............... 340/703, 728, 793, 747, 340/798, 800, 801; 382/50

[56] References Cited

U.S. PATENT DOCUMENTS

| | | | |
|---|---|---|---|
| 3,573,789 | 4/1971 | Sharp | 340/728 |
| 3,800,078 | 3/1974 | Cochran | 382/50 |
| 3,961,132 | 1/1976 | Landsman . | |
| 4,003,024 | 1/1977 | Riganati et al. | 382/50 |
| 4,013,827 | 3/1977 | Starck et al. | 358/263 |
| 4,079,367 | 3/1978 | Yonezawa et al. | 340/728 |
| 4,084,195 | 4/1978 | Pereira | 358/280 |
| 4,129,853 | 12/1978 | Althauser | 382/50 |
| 4,149,145 | 4/1979 | Hartke et al. | 340/750 |
| 4,215,414 | 7/1980 | Huelsman | 340/728 |
| 4,225,861 | 9/1980 | Langdon, Jr. et al. | 340/703 |
| 4,242,678 | 12/1980 | Somerville | 340/728 |
| 4,251,837 | 2/1981 | Janeway | 382/50 |
| 4,352,105 | 9/1982 | Harney | 340/703 |

Primary Examiner—Marshall M. Curtis
Attorney, Agent, or Firm—Frederick E. McMullen

[57] ABSTRACT

An image thresholding system employing a ROM look up table to make threshold decisions. A plurality of shift registers are used to convert a digital pixel input which includes the pixel to be processed to an address for use in addressing the ROM look up table to provide a thresholded value for the pixel being processed. The output of the ROM look up table is utilized, together with other pixels from the pixel input, to address a second ROM look up table to provide a further refined threshold decision.

1 Claim, 2 Drawing Figures

IMAGE THRESHOLDING SYSTEM

The invention relates to an image processing system and method and more particularly to a simplified image processing system and method.

Image processing often includes the functions of image enhancement, pixel interpolation, adaptive thresholding, and the like. The techniques for implementing these various functions have been refined in the prior art. However, all these techniques have a common ingredient, namely a decision to be made on one pixel based on information gathered from adjacent pixels. The circuits for carrying out these techniques may be implemented with either analog or digital approaches. Where a digital implementation is chosen, the circuit typically consists of several digital shift registers for pixel storage, and adders, multipliers, and comparators for arithmetic processing. This digital circuitry can become quite complex and hence expensive. And while Large Scale Integrated (L.S.I.) circuit technology may be used to implement the processing circuits, the expense and relative inflexability thereof makes the use of L.S.I. unattractive.

The invention as claimed is intended to solve these problems by replacing the image processing circuits with memory to thereby reduce the number of circuit components required and enhance system economy. More particularly, the invention provides an image processing system for processing image pixels having memory means for storing the results of various image processing operations on some number of adjacent pixels; and means for addressing the memory means for each pixel to be processed using a preset combination of unprocessed input pixels including the pixel to be processed as an address whereby to provide a processed pixel output for each pixel.

The invention also provides a method of processing image pixels including the steps of storing discrete predetermined pixel image values in memory; and addressing the memory using a preset combination of unprocessed image pixels including the pixel to be processed to cause the memory to output an image pixel value for the pixel being processed in accordance with the address.

IN THE DRAWINGS

Figure 2:
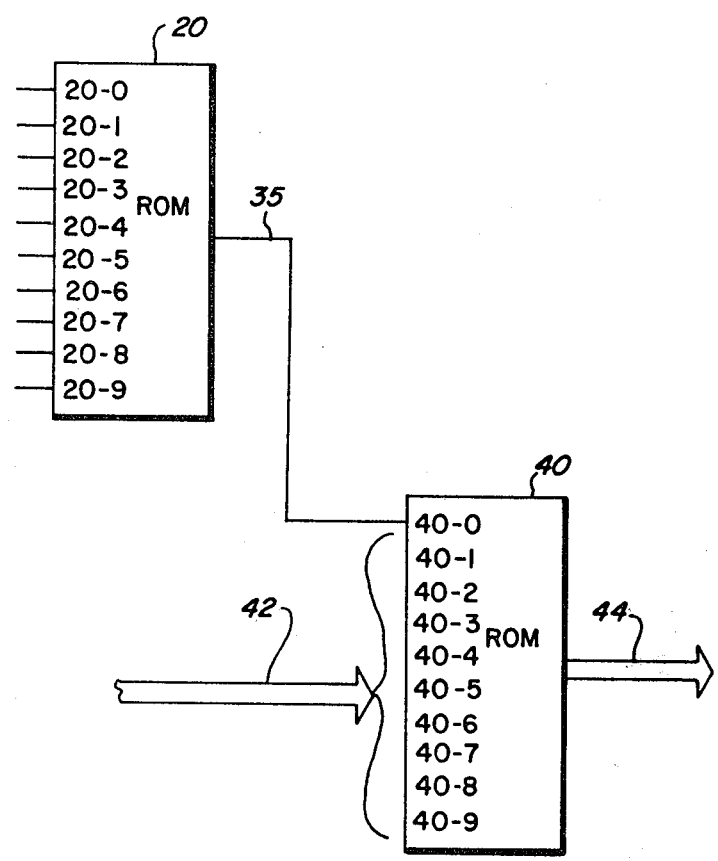

FIG. 1 is a schematic view showing details of the pixel processing system of the present invention; and FIG. 2 is a schematic view showing details of an alternate pixel processing system wherein multiple memories are employed.

Referring to FIG. 1 of the drawings, the image processing system 10 of the present invention is thereshown. System 10 includes an input bus 12 for input of image signals or pixels in digital form to the first stage 14-1 of a multi-stage shift register bank 15. As will be understood, the image pixels may be derived from any suitable source such as a memory, raster input scanner, and the like, the normally analog image signals being converted to multi-bit digital representations of image grey level by suitable means (not shown) prior to input to the image processing system 10. In the exemplary arrangement shown, a 4-bit digital input is employed to represent each pixel although other pixel bit representations may be used instead.

In the exemplary arrangement shown, shift register bank 15 has three shift register stages 14-1, 14-2, and 14-3. Since the shift register stages 14-1, 14-2, and 14-3 each impose a one pixel delay on the stream of pixels passing therethrough, the pixel being examined (pixel $P_1$ herein) is at any instant disposed in shift register 14-2 while shift registers 14-1 and 14-3 hold adjoining or neighboring pixels $P_2$, $P_0$ respectively. The shift register stages are coupled in succession by means of bus 12. While shift register bank 15 is illustrated as comprising three shift register stages 14-1, 14-2, and 14-3, one or more shift register stages may be readily contemplated. Further, the image pixel to be processed may instead reside in any one of the shift register stages.

A suitable memory such as ROM 20 is provided. In the exemplary arrangement described herein, ROM 20 serves as a repository for storing discrete threshold pixel values. As will be understood, each of the discrete threshold values in ROM 20 is assigned a different address commensurate with the image content represented by each pixel address. It will be understood however, that ROM 20 may store the results of any image processing operation desired, such as the aforementioned thresholding, or image enhancement, interpolation, adaptive thresholding and the like as will be understood by those skilled in the art.

A series of addressing leads 22-1, 22-2, 22-3; 24-1, 24-2, 24-3, 24-4; and 26-1, 26-2, 26-3 are tapped off of data bus 12, leads 22-1, 22-2, and 22-3 being tapped into the output side of shift register 14-1, leads 24-1, 24-2, 24-3, 24-4 being tapped into the output side of shift register 14-2, and leads 26-1, 26-2, 26-3 being tapped into the output side of shift register 14-3. The addressing leads are coupled to successive input terminals 20-0, 20-2 . . . 20-9 of ROM 20 to enable ROM 20 to be addressed by the image pixels input to shift register bank 15. A video output bus 35 is coupled to the output terminal of ROM 20, bus 35 serving to feed pixel values output by ROM 20 to a suitable user such as a memory, a raster output scanner, and the like.

A suitable pixel clock 39 is provided for generating pixel clock signals for clocking the pixels to be processed through shift register bank 15, the output clock 39 being coupled to the clock terminals of shift registers 14-1, 14-2, 14-3 by means of clock lead 41.

In operation, image pixels input to bus 12 are successively clocked into shift register stages 14-1, 14-2, and 14-3 of shift register bank 15 by pixel clock signals from clock 39. As described, in the arrangement shown, the pixel being processed (pixel $P_1$ herein) is resident in shift register stage 14-2, while shift register stages 14-1 and 14-3 hold adjoining pixels (i.e. pixels $P_2$ and $P_0$). At each pixel clock pulse, the bit values appearing at the outputs of shift registers 14-1, 14-2, and 14-3 are input via addressing leads 22-1, 22-2, 22-3; 24-1, 24-2, 24-3, 24-4; and 26-1, 26-2, 26-3 to the input terminals of ROM 20. There, the bit values cooperate to form an address for addressing ROM 20 to provide in output bus 35 a pixel image value for the pixel being processed, i.e. pixel $P_1$.

The pixel values in ROM 20 may be derived in any suitable manner, i.e. through calculations, scanning predetermined test targets, and the like. For example, a pixel weighting relationship may be established as shown in the TABLE. Assuming that pixels have a value ranging from 0 (i.e. black) to 15 (i.e. white) with in between numbers representing various shades of gray, the values to be stored in ROM 20 for the various possible pixel address combinations may be determined from the following relationship where the output of ROM 20 to bus 35 is true if:

$$(1.5)(P_1) - (0.25)(P_0 + P_2) > 8$$

TABLE

| ROM 20 | Pixel | Weight |
|---|---|---|
| 20-0 | $P_1$ | 1 |
| 20-1 | $P_1$ | 2 |
| 20-2 | $P_1$ | 4 |
| 20-3 | $P_1$ | 8 |
| 20-4 | $P_0$ | 2 |
| 20-5 | $P_0$ | 4 |
| 20-6 | $P_0$ | 8 |
| 20-7 | $P_2$ | 2 |
| 20-8 | $P_2$ | 4 |
| 20-9 | $P_2$ | 8 |

The size of ROM 20 is, as will be understood, chosen to accommodate the image processing constraints desired and may be increased or decreased in accordance with the desire to increase or decrease image grey level distinctions. Similarly, the size of shift register bank 15 may be changed to provide increased participation of neighboring pixels. And as will be understood the weight accorded adjoining or neighboring pixels may not be equal to the weight accorded the pixel being processed.

In the embodiment shown in FIG. 2 of the drawings where like numerals refer to like parts, a second memory in the form of ROM 40 is provided. The output of ROM 20 to bus 35 is fed to one input 40-0 of ROM 40, the output of ROM 20 serving in this embodiment as an address. A second input bus 42 provides additional address information from alternate inputs, which may for example comprise additional adjoining or neighborhood pixels, to ROM 40. The output of ROM 40 which comprises the pixel value associated with the address information input from ROM 20 together with image information from additional sources, is output via bus 44 to the user.

The processing system herein described reduces the number of component parts required, provides a more economical processing system, and allows ready programming of the system.

While the invention has been described with reference to the structure disclosed, it is not confined to the details set forth, but is intended to cover such modifications or changes as may come within the scope of the following claims.

We claim:

1. In an image processing system for thresholding a stream of image pixels to provide refined image values, the combination of:

a first memory for storing a plurality of thresholded pixel image values at discrete memory locations, said first memory including plural input terminals through which said first memory locations are addressed;

a plurality of shift register stages in series with said image pixel stream, said image pixels passing through said shift register stages in succession;

plural address lines coupled to said first memory input terminals for addressing said first memory locations, said address lines being coupled to the outputs of said shift register stages in predetermined order whereby pixels in said pixel stream provide an address for addressing said first memory locations so that said first memory provides pixel image values corresponding thereto;

a second memory for storing a second plurality of thresholded pixel image values at discrete memory locations, said second memory including plural input terminals through which said second memory locations are addressed; and plural address lines coupled to said second memory input terminals for addressing said second memory locations, at least one of said second memory address lines being coupled to the output of said first memory whereby the pixel image values output by said first memory address said second memory so that said image pixel values from said first memory are further processed by said second memory.

* * * * *